United States Patent
Calvarese et al.

(10) Patent No.: US 10,140,829 B1
(45) Date of Patent: Nov. 27, 2018

(54) RFID FUNCTIONS FOR POINT OF SALE LANES

(71) Applicant: SYMBOL TECHNOLOGIES, LLC, Lincolnshire, IL (US)

(72) Inventors: Russell Calvarese, Stony Brook, NY (US); Richard J. Lavery, Huntingdon, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/666,067

(22) Filed: Aug. 1, 2017

(51) Int. Cl.
  *G08B 13/24* (2006.01)
  *G06K 7/10* (2006.01)

(52) U.S. Cl.
  CPC ....... *G08B 13/246* (2013.01); *G06K 7/10415* (2013.01); *G06K 7/10475* (2013.01); *G08B 13/248* (2013.01)

(58) Field of Classification Search
  CPC .............. G08B 13/246; G08B 13/2451; G08B 13/2465; G08B 13/2477; G08B 13/248; G08B 13/2482; G06K 7/10415; G06K 7/10475
  USPC ... 340/10.1–10.6, 568.1, 568.5, 572.1–572.8
  See application file for complete search history.

(56) References Cited

U.S. PATENT DOCUMENTS

| | | | |
|---|---|---|---|
| 2010/0274669 A1* | 10/2010 | Carlson | G06Q 30/0261 705/14.58 |
| 2013/0062409 A1* | 3/2013 | Nahill | G06K 7/1091 235/439 |
| 2016/0071385 A1* | 3/2016 | Chave | G08B 13/2402 340/572.1 |
| 2017/0251183 A1* | 8/2017 | Crooks | G07G 1/0054 |

* cited by examiner

*Primary Examiner* — Brian Wilson
(74) *Attorney, Agent, or Firm* — Yuri Astvatsaturov (57) ABSTRACT

A system and method for selectively activating a radio frequency (RF) identification (RFID) reader within a venue having a point of sale (POS) lane. In various aspects, a first detector detects a POS lane activity state of the POS lane, where the POS lane activity state comprises an active state or an inactive state. A second detector detects a presence of a person in the POS lane, such that a processor, operatively connected to the first detector and the second detector, activates a first a first RFID reader, the first RFID reader having a reading range that extends over the POS lane, the activation occurring upon an indication by the first detector that the POS lane activity state has the inactive state and upon a further indication by the second detector that the person is present within the POS lane.

31 Claims, 4 Drawing Sheets

RFID FUNCTIONS FOR POINT OF SALE LANES

BACKGROUND OF THE INVENTION

Retail stores generally include several point of sale (POS) lanes used to facilitate consumer checkout and purchase processes. In certain cases, for example when not operating at full capacity, a store with multiple POS lanes may have one or more closed POS lanes. Such closed POS lanes typically have no cashier, or other purchase process, available for a consumer to interact with. Often a closed lane has no barricade that would otherwise prevent shoppers from entering or exiting the store through the closed lane. In addition, Radio Frequency Identification (RFID) readers of closed lanes can typically be turned off to avoid possible interference with RFID readers in adjacent, open lanes.

This can create issues because, when customers pass through a closed POS lane, items tagged with an RFID tag are not read. For example, RFID tagged items that were not paid for, and that exit through a closed POS lane, may not be detected as a shrink (also referred to as "theft") attempt/event. It is often critical that any theft attempt event be identified early enough to allow store personnel to respond to the event before the item or items are carried out of the store. Furthermore, stolen items can adversely affect inventory counts which can be crucial to conducting an efficient retail operation.

Second, when entering a store through a closed POS lane or other area of the store, shoppers may be carrying or wearing tagged items that were previously purchased from that store or, in some cases, from another store. In such instances, the tagged item may be read by an RFID reader in the store, forcing the store's system to determine the state of the tagged item, but without having the information that the item was actually introduced from the outside (and was not otherwise an item already in stock at the store). This can create issues because inventory accuracy correction systems (e.g., tracking the count of inventory of the item of the store) may be based on the lack of information, incorrectly assign the state of the tagged item and, thereby, introduce error into any related inventory control or tracking system.

Accordingly, there is a need for systems and methods directed to improved RFID functions for associated with point of sale lanes.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The embodiments of the present disclosure utilize smart RFID readers, camera systems, and other similar devices, networked within a retail store or other venue to create intelligent systems and methods to address the issues associated with closed POS lanes. As described herein, assuming the availability of smart RFID detectors, camera detectors, and other such detectors/sensors, systems and methods can be implemented that identify moving objects (e.g., with video capture or moving RFID tags), and provide the association information to the smart system as items or products enter or are detected within the POS area or within other regions of the venue. Such detection can be used to signal a possible theft or shrink alert at, for example, a closed POS lane. This alert may be sent before the items are carried to an exit of a retail venue, thereby giving store personal time to act.

As described herein, the embodiments of the present disclosure are directed to systems and methods for selectively activating a radio frequency RFID reader within a venue having a POS lane. The venue may be, for example, a retail store with one or more POS lanes. The systems and methods may include a first detector for detecting a POS lane activity state of a POS lane. In various embodiments, the POS lane activity state may be either an active state or an inactive state, where, for example, the inactive state can indicate a closed POS lane.

The systems and methods may further include a second detector for detecting a presence of a person in a POS lane and a first RFID reader having a reading range that extends over the POS lane. In some embodiments, the first RFID reader may be positioned between the POS lane and another POS lane.

In various embodiments, a processor that is operatively connected to the first detector, the second detector, and the first RFID reader, may activate the first RFID reader upon an indication by the first detector that the POS lane activity state has an inactive state and upon a further indication by the second detector that a person is present within the POS lane.

In some embodiments, the processor may be further configured to generate an alert upon the first RDIF reader reading an RFID tag with the POS lane. In certain embodiments, the alert may be transmitted to a security module for security systems or security associated with the venue to take appropriate action.

In various embodiments, the second detector may include a video camera. The video camera may be configured to track the person in the POS lane and obtain positional data associated with the person. In some embodiments, the processor may be further configured to cause the first RFID reader to transmit an interrogation signal at a power level, the power level being based at least in part on the positional data. In at least one embodiment, the processor may adjust the power level in response to a change in the positional data. In another embodiment, the processor may adjust the power level in response to the positional data being static. In a further embodiment, the processor may adjust the power level in response to an RF noise level associated with the positional data.

In some embodiments, the processor may cause the first RFID reader to transmit an interrogation signal in a direction, where the direction is based at least in part on the positional data. In at least one embodiment, the processor may adjust the direction in response to a change in the positional data.

In other embodiments, the video camera may be configured to track the person prior to the person entering the POS lane to obtain a set of data, where the processor may determine a confidence level of a shrink event based at least in part on the set of data. In some embodiments, the processor may generate an alert upon the RDIF reader reading an RFID tag and the confidence level exceeding a threshold level. In another embodiment, the processor may generate an alert upon the first RDIF reader reading an RFID tag, where the alert includes an indication of the confidence level.

In various embodiments, a second RFID reader may be configured to detect at least one incoming RFID tag, where the incoming RFID tag is a tag that is brought into the venue from outside of the venue. In such embodiments, the processor may generate an alert upon the second RFID reader reading the incoming RFID tag. In an alternative embodiment, the processor may generate an alert upon the first RFID reader reading an RFID tag in the POS lane and determining that the RFID tag in the POS lane is different from the at least one incoming RFID tag.

Figure 1:
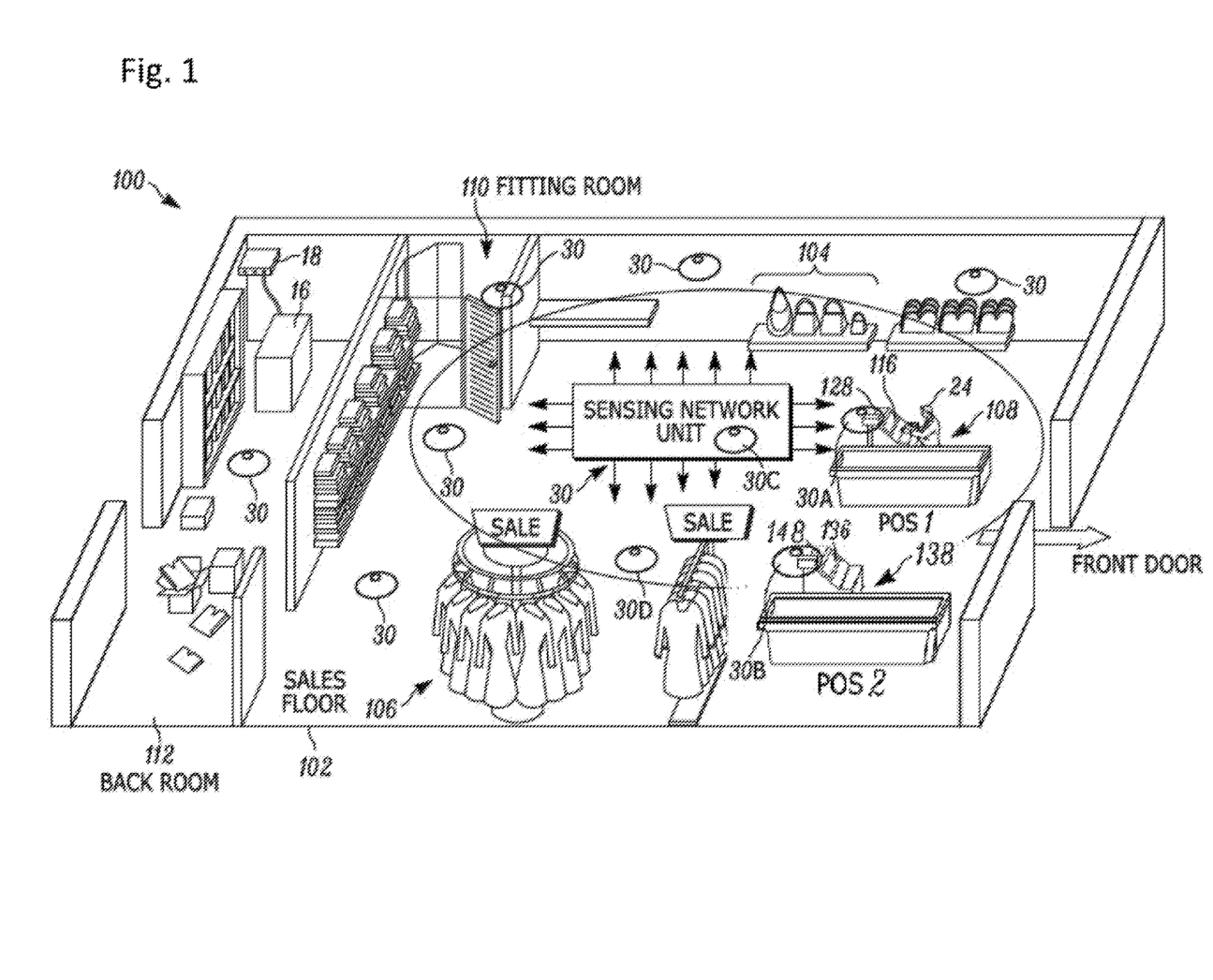
FIG. 1 is a perspective view, as seen from above, of a retail venue illustrating an arrangement for selectively activating a radio frequency RFID reader within the retail venue having multiple POS lanes in a venue in which detector stations are deployed, in accordance with an example.

FIG. 1 illustrates a perspective view, as seen from above, of a retail venue 100 illustrating an arrangement for selectively activating a radio frequency RFID reader within the retail venue having multiple POS lanes in the venue in which detector stations 30 are deployed. In the example embodiment of FIG. 1, the retail venue includes a backroom 112 that has a centralized controller 16. The retail venue also includes a fitting room 110, and a retail sales floor 102 with various retail items (e.g., 104 and 106), and two POS stations (108 and 138) that each have respective POS lanes (POS lane 1 and POS lane 2). Each of the POS stations (108 and 138) may include various equipment. For example, POS station 108 may include a computer system 116 and an interface 128 that may include, for example, an optical scanner, touchpad, keypad, display, and data input/output interface connecting to the computer system 116. The computer system 116 may be operated by store personnel 24, which may be, for example, an employee, contract worker, owner, or other operator of the retail store. POS station 138 may similarly include a computer system 136 and an interface 148 that may include, for example, an optical scanner, touchpad, keypad, display, and data input/output interface connecting to the computer system 136. POS station 138 is not operated by store personnel and, therefore, at least in some embodiments may represent a closed, inactive, or otherwise empty POS lane or station.

The venue 100 further includes the centralized controller 16 which may comprise a networked host computer or server. The centralized controller 16 may be connected to a plurality of detector stations 30 positioned throughout the venue 100 via the network switch 18. As further described herein, the detector stations 30 are able to detect targets including, for example, people, such as store personnel 24 or consumers within the store (not shown), as well as the various retail products or items being offered for sale on the floor 102, e.g., clothes 106, handbags 104, etc., that are arranged on shelves, hangers, racks, etc. In addition, each such product may be tagged with a RFID tag for detection as described herein, where consumers carrying the products can be tracked via RFID readers.

Each of the computer systems 116 and 136 may comprise one or more processors and may be in electronic communication with centralized controller 16 via the network switch 18 and/or via wired, wireless, direct, or networked communication with one or more of the detector stations 30, where the detector stations 30 may transmit and receive wired or wireless electronic communication to and from the computer systems 116 and 136. Similarly, each of the detector stations 30 may either be in either wired or wireless electronic communication with centralized controller 16 via the network switch 18. For example, in some embodiments, the detector stations 30 may be connected via Category 5 or 6 cables and use the Ethernet standard for wired communications. In other embodiments, the detector stations 30 may be connected wirelessly, using built-in wireless transceiver, and may use the IEEE 802.11 (WiFi) and/or Bluetooth standards for wireless communications. Other embodiments may include detector stations 30 that use a combination of wired and wireless communication.

The interfaces 128 and 148 may provide a human/machine interface, e.g., a graphical user interface (GUI) or screen, that presents information in pictorial and/or textual form (e.g., representations of bearings of the RFID-tagged products 104, 106). Such information may be presented to the store personnel 24, or to other store personnel such as security personnel (not shown). The computer systems (116, 136) and the interfaces (128, 148) may be separate hardware devices and include, for example, a computer, a monitor, a keyboard, a mouse, a printer, and various other hardware peripherals, or may be integrated into a single hardware device, such as a mobile smartphone, or a portable tablet, or a laptop computer. Furthermore, the interfaces (128, 148) may be in a smartphone, or tablet, etc., while the computer systems (116, 136) may be a local computer, or a remotely hosted in a cloud computer. The computer systems (116, 136) may include a wireless RF transceiver that communicates with each detectors station 30, for example, via Wi-Fi or Bluetooth.

Figure 2:
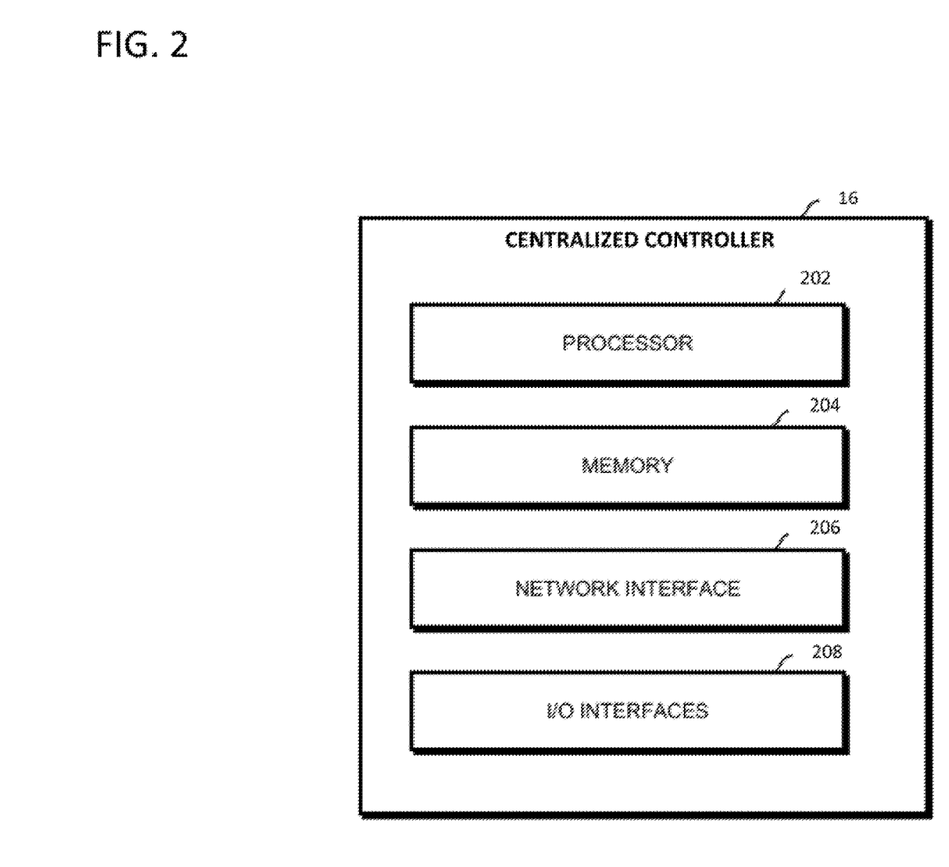
FIG. 2 is a block diagram representative of an embodiment of a centralized controller of FIG. 1.

FIG. 2 is a block diagram representative of an embodiment of centralized controller 16 of FIG. 1. The centralized controller 16 is configured to execute computer instructions to perform operations associated with the systems and methods as described herein, for example, implement the example operations represented by the block diagrams or flowcharts of the drawings accompanying this description. The centralized controller 16 may implement enterprise service software that may include, for example, Restful (representational state transfer) API services, message queuing service, and event services that may be provided by various platforms or specifications, such as the J2EE specification implemented by any one of the Oracle WebLogic Server platform, the JBoss platform, or the IBM WebSphere platform, etc. As described below, the centralized controller 16 may be specifically configured for performing operations represented by the block diagrams or flowcharts of the drawings described herein.

The example centralized controller 16 of FIG. 2 includes a processor 202, such as, for example, one or more microprocessors, controllers, and/or any suitable type of processor. The example centralized controller 16 of FIG. 2 further includes memory (e.g., volatile memory or non-volatile memory) 204 accessible by the processor 202, for example, via a memory controller (not shown). The example processor 202 interacts with the memory 204 to obtain, for example, machine-readable instructions stored in the memory 204 corresponding to, for example, the operations represented by the flowcharts of this disclosure. Additionally, or alternatively, machine-readable instructions corresponding to the example operations of the block diagrams or flowcharts may be stored on one or more removable media (e.g., a compact disc, a digital versatile disc, removable flash memory, etc.), or over a remote connection, such as the Internet or a cloud-based connection, that may be coupled to the centralized controller 16 to provide access to the machine-readable instructions stored thereon.

The example centralized controller 16 of FIG. 2 may further include a network interface 206 to enable communication with other machines via, for example, one or more computer networks, such as a local area network (LAN) or a wide area network (WAN), e.g., the Internet. The example network interface 206 may include any suitable type of communication interface(s) (e.g., wired and/or wireless interfaces) configured to operate in accordance with any suitable protocol(s), e.g., Ethernet for wired communications and/or IEEE 802.11 for wireless communications.

The example centralized controller 16 of FIG. 2 includes input/output (I/O) interfaces 208 to enable receipt of user input and communication of output data to the user, which may include, for example, any number of keyboards, mice, USB drives, optical drives, screens, touchscreens, etc.

Figure 3:
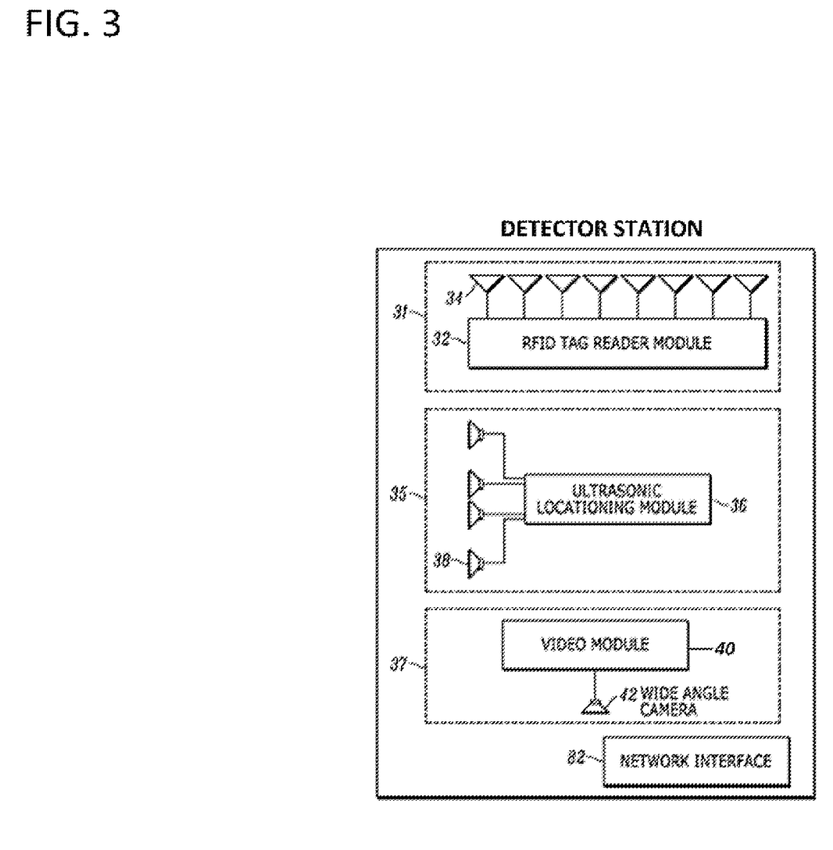
FIG. 3 is a block diagram illustrating an example implementation of a detector station, including several detectors, as may be used in the retail venue of FIG. 1, in accordance with an example embodiment.

FIG. 3 is a block diagram illustrating an example implementation of an embodiment of a detector station 30. In the illustrated example, the detector station 30 includes three example detectors 31, 35, and 37, as further described herein. For example, a detector in the form of a RFID tag reader 31 is operative for reading a target (e.g., a RFID tag associated with a product or person). In one embodiment, for example, an RFID tag attached to product resting on a shelf may be read and detected by its attached RFID tag. Similarly, an RFID tag associated with a product that a person has picked up may be detected and tracked as the person moves through the venue 100.

More particularly, as shown in FIG. 3, each RFID reader 31 includes an RFID tag reader module 32 that has a controller, a memory, and an RF transceiver, which are operatively connected to a plurality of RFID antenna elements 34, which are energized by the RFID module 32 to radiate RF energy (also referred to herein as a beam) over an antenna beam pattern. As those of skill will recognize, an antenna and its beam pattern can be characterized by the antenna's beam width (i.e., the antenna's half power beam width). The RF reader 31 is operated, under the control of the tag reader module 32, to transmit RF beam or wave energy to the tags, and to receive RF response signals from the tags, thereby interrogating and processing the payloads of the tags that are in a reading zone of the RF transceiver. The RFID reading zone for a detector station 30 may be a 360° zone defined by the RFID antenna elements 34 and their collective beam patterns. In various embodiments, a detector 30 may include eight RFID antenna elements 34, each maintained in a fixed position and each having a beam pattern extending in a different direction. During operation, the RF transceiver may capture payload data or target data that identifies the tags and their associated products (e.g., retail items 104 and/or 106). The centralized controller 16 may be configured to control the overhead RFID readers in the plurality of detector stations 30 to read the tags on the products (e.g., retail items 104 and/or 106) in a reading mode of operation in accordance with a set of reading parameters.

Referring to FIG. 1, store personnel 24 may hold, carry, and operate any mobile device such as, a mobile phone, or as illustrated by way of non-limiting example, a handheld, portable, mobile RFID tag reader 22 (not shown) during his/her movement within the venue 100. As described below, the store personnel 24 himself/herself and/or the tag reader 22, may each be considered, either individually or jointly, as a mobile target to be located and tracked in the venue. The mobile reader 22 has a controller, a memory, and an RF transceiver operatively connected to an RFID antenna (e.g., RFID antenna 34), which are together operative for reading the product tags associated with products (e.g., 104 and/or 106) in the venue 100. The store personnel 24 may be any individual, employee, operator, or associate authorized to operate the handheld, mobile reader 22. In some embodiments, to initiate reading, the store personnel 24 may actuate an actuator or trigger on the mobile reader 22. More than one mobile reader 22 may be present and/or movable in the venue 100 at a time.

Each detector station 30 may include another sensing detector, as shown in FIG. 3. For example, an ultrasonic locationing detector 35 may be operative for locating, for example, a phone, a mobile device, or by way of non-limiting example, the mobile reader 22, by transmitting an ultrasonic signal to an ultrasonic receiver, e.g., a microphone, on the mobile reader 22 or phone. More particularly, the locationing detector 35 includes an ultrasonic locationing module 36 having control and processing electronics operatively connected to a plurality of ultrasonic transmitters, such as voice coil or piezoelectric speakers 38, for transmitting ultrasonic energy to the microphone on the mobile reader 22. The receipt of the ultrasonic energy at the microphone locates the mobile reader 22. Each ultrasonic speaker 38 periodically transmits ultrasonic ranging signals, preferably in short bursts or ultrasonic pulses, which are received by the microphone on the mobile reader 22. The microphone determines when the ultrasonic ranging signals are received. The locationing module 36, under the control of the centralized controller 16, directs all the speakers 38 to emit the ultrasonic ranging signals such that the microphone on the mobile reader 22 will receive minimized overlapping ranging signals from the different speakers 38. The flight time difference between the transmit time that each ranging signal is transmitted and the receive time that each ranging signal is received, together with the known speed of each ranging signal, as well as the known and fixed locations and positions of the speakers 38 on each detector station 30, are all used to determine the location (i.e., position) and/or direction of travel of the microphone and of the mobile reader 22, using a suitable locationing technique, such as triangulation, trilateration, multilateration, etc. Such locationing and direction of travel may be determined by analyzing data from multiple detector stations 30 and centralized controller 16. In some embodiments, some detectors may be configured to determine location, while other detectors may be configured to determine direction of travel.

In the illustrated example of FIG. 3, the detector station 30 may further include a video detector 37 operative for detecting or locating a target by capturing an image of the target in the venue 100, such as a person moving through venue 100 or an item sitting on a shelf of venue 100. More particularly, the video detector 37 may be mounted in each detector station 30 and may include a video module 40 having a camera controller that is connected to a camera 42, which may be, for example, a wide-angle field of view camera for capturing the image of a target. In some embodiments, the camera 42 may be a high-bandwidth, video camera, such as a moving picture expert group (MPEG) compression camera. In other embodiments, the camera may include wide-angle capabilities such that camera 42 would be able to capture images over a large area to produce a video stream of the images. As referred to herein, the image capture devices or video cameras (also referred to as image sensors herein) are configured to capture image data representative of the venue or an environment of the venue. Further, the image sensors described herein are example data capture devices, and example methods and apparatuses disclosed herein are applicable to any suitable type of data capture device(s). In various embodiments, the images or data from the images may be synchronized or fused with other data, such as RFID data, and used to further describe, via data, the venue or environment of the venue. Such synchronized or fused data may be used, for example, by the centralized controller 16 to make determinations or for other features as described herein.

As described, each of the detector stations 30 may collect locationing and direction of travel information from its one or more detectors, such as the RFID reader 31 and/or the ultrasonic detector 35. That information is correlated with the video detector 37 to capture and filter video images based on the location and/or direction of travel of the target, such as a product or person. In particular, a detector station 30 may filter captured video to segment out from the captured wide-angle video, images of the target near the target sensing station, as the target is moved through the venue. That segmenting may result in discarding video images that do include the target or discarding portions of the wide-angle video that extend beyond an area of interest surrounding and including the target itself.

In various embodiments, focusing, image tilting, and image panning procedures may be determined by first performing image processing on the target in the wide-angle video stream. For example, in some embodiments, a detector station 30 may perform target identification procedures over the determined field of view, procedures such as edge detection to identify the target, segmentation to segment out the target's image from other objects in the video stream, and a determination of any translational, rotational, shearing, or other image artifacts affecting the target image and that would then be corrected for before using the captured target image.

Any of the detector stations 30, including alone, together, or some combination thereof, may transmit electronic information, including any RFID, Ultrasonic, video, or other information, to the centralized controller 16 for processing. For example, the central controller 16 of FIG. 2 may include a network communication interface 206 communicatively coupled to network communication interfaces 82 of the detector stations 30 to receive sensing detector data, such as RFID information and/or ultrasonic locationing information, and video stream data, such as a video stream from the wide-angle camera 42. The detector stations 30 may also receive information, commands, or execution instructions, including requests to provide additional sensory or detection information from the centralized controller 16 in order to perform the features and functionally as described herein.

Figure 4:
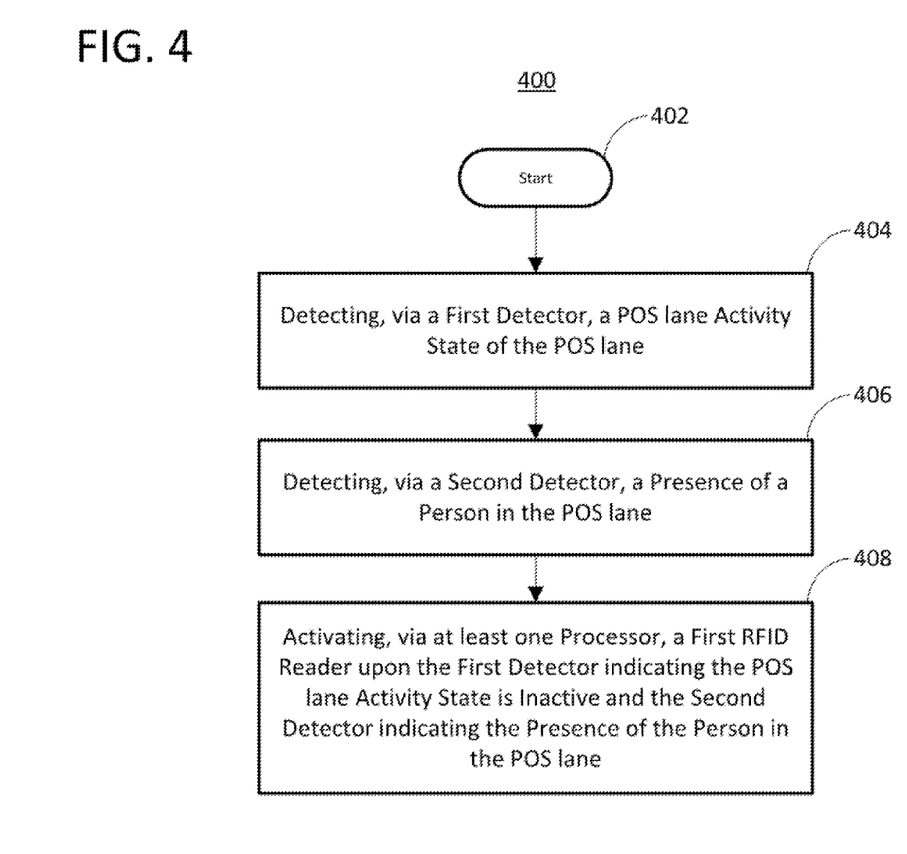
FIG. 4 is a flow chart of a method for selectively activating a radio frequency RFID reader within a venue having a POS lane, in accordance with an example embodiment.

FIG. 4 is a flow chart of a method 400 for selectively activating a radio frequency RFID reader within a venue having a POS lane. As described herein, the venue may be, for example, a retail store with one or more POS lanes, such as POS lanes 1 and 2 as depicted in FIG. 1. The method 400 may begin (402) at block 404 where a first detector detects a POS lane activity state of the POS lane. For example, with reference to FIG. 1, the first detector may be a video camera 42 associated with detector station 30C that identifies the lane activity state of POS lane 1. The POS lane 1 activity state may be either an active state or an inactive state. For example, the POS lane 1 of POS station 108 may be in an active state because it is being operated by store personnel 24 and is available to execute consumer transactions. The active state may be determined for example, by a video detector 37, including camera 42, of detector station 30C imaging that the store personnel is operating POS station 108. In another embodiment, the active state may be detected by any of a toggle switch, timer, presence sensor, motion sensor, pressure mat (e.g., store personnel 24 standing on the mat), such that the activity state is transmitted to centralized controller 16 for storage and association of the active state with POS station 108. In other embodiments, an operator of centralized controller may send a command signal from centralized controller 16 indicating that the POS station 108 and POS lane 1 has an active state.

As another example, the first detector may be a video camera 42 or RFID reader 32 associated with detector station 30D that detects the lane activity state of POS lane 2. The POS lane 2 activity state may also be either an active state or an inactive state, and may be indicated in the same manners as described for POS lane 1. However, the POS lane 2 of POS station 138 may, for example, be in an inactive state because it is not being operated by any store personnel and, therefore, is unavailable to execute consumer transactions. For example, the camera 42 of detector station 30D may produce electronic imaging frames of the POS station 138 that lack store personnel or the camera 42 of detector station 30D may produce electronic imaging frames of the POS station 138 that include a "closed" light or sign associated with POS station 138. In each example embodiment, the electronic image frames may be sent to central controller 16 that would indicate that the inactive state for POS station 138 and POS lane 2.

At block 406 a second detector may be configured to detect a presence of a person in the POS lane. For example, the second detector may be a camera 42 or RFID reader 32 of detector station 30A, where the detector of detector station 30A detects a person, e.g., via video image capture and/or via an RFID signal received from an RFID tag associated with a product (e.g., 104 or 106) that the user has selected for purchase, checking out at POS station 138 in POS lane 1.

As an additional example, the second detector may be a camera 42 of detector station 30B associated with POS station 138, where the detector station 30D detects a person, e.g., via video image capture showing a person and product (e.g., 104 or 106) that the user has picked up from the sales floor 102, moving through POS lane 2 of POS station 138. In other embodiments, the second detector may be a motion sensing device (e.g., attached to POS station 138) or a pressing sensing mat or tile (e.g., placed on the floor of POS lane 2) that detects the presence of a person moving through POS lane 2.

At block 408 a processor, such as processor 202 of centralized controller 16, may activate a first RFID reader, such as an RFID reader 31 of detector station 30B, upon an indication by the first detector that the POS lane 2 activity state has the inactive state and upon a further indication by the second detector, e.g., the camera 42 of detector station 30B, that a person is present within POS lane 2. For example, the processor may be one or more processors of centralized controller 16 as described for FIG. 2, that, upon receiving video images from the camera 42 of detector station 30B of a person moving through POS lane 2 of POS station 138 and upon determining that POS lane 2 is associated with an inactive state, may activate an RFID reader of either detector station 30D or 30B. In any event, the activated RFID reader includes a reading range that extends over the POS lane, e.g., POS lane 2. Once activated, the RFID reader may determine whether an RFID tag is present on the person or an item that the person is carrying. The RFID reader may be an RFID reader 31 of the same detector 30B that had the camera 42 that detected the presence of the person in POS lane 2, or it may be an RFID reader of a different detector, such as a detector of detector station 30D, or it may be a separate RFID reader positioned near the POS lane or near the POS itself. In another example, the RFID reader may be positioned within the housing of a bi-optic scanner used at the POS such that its read zone is over the scanner in an area where products are expected to be placed or swiped.

In some embodiments, the first RFID reader may be positioned between the POS lane and another POS lane, for example, in an embodiment where an RFID reader of detector station 30C were activated by the processor 202, where detector station 30C is positioned between POS lane 1 and POS lane 2.

In some embodiments, the processor, such as processor 202 of centralized controller 16 of FIG. 2, may be further configured to generate an alert upon the first RFID reader reading an RFID tag. In certain embodiments, the alert may be transmitted to a security module for security systems or security personnel associated with the venue to take appropriate action. For example, the security module (not shown) could be included as part of central controller 16, as security software executing on process 202 of central controller 16, that could, e.g., alert store personnel of a possible theft or shrink event.

In various embodiments, the second detector may include a video camera, such as camera 42 as described herein. The video camera may be configured to track the person in the POS lane and obtain positional data associated with the person. In some embodiments, the processor (e.g., processor 202) may be further configured to cause the first RFID reader to transmit an interrogation signal at a certain power level, where the power level is based on at least in part on the positional data. In at least one embodiment, the processor may adjust the power level in response to a change in the positional data. In another embodiment, the processor may adjust the power level in response to the positional data being static. In a further embodiment, the processor may adjust the power level in response to an RF noise level associated with the positional data.

For example, in certain embodiments, multiple inactive POS lanes can be employed based on the relative location of the detected motion near the inactive POS lanes. In such an embodiment, for example, the centralized controller 16 may analyze data from each RFID reader associated with the inactive POS lanes and may build a list of static tags in its environment when read at multiple power levels (low, medium, high). When a person is determined to be passing through a certain inactive POS, as described herein, the minimum power level necessary to read any tags on that person based on their estimated distance to the reader may be selected, e.g., by the centralized controller 16. This would maximize the chance of reader a tag on the person of interest while minimizing the chance of interfering with any nearby active POS lanes. In addition, if a person is within range of multiple inactive RFID readers, the interrogations from those readers can be timed to read at a specific time and power level so as to not interfere with each other while providing multiple attempts to read tags on the person of interest passing through an inactive lane.

In other embodiments, the processor (e.g., processor 202) may cause the first RFID reader to transmit an interrogation signal in a direction, the direction being based at least in part on the positional data. In at least one embodiment, the processor may adjust the direction in response to a change in the positional data.

In other embodiments, a video camera, such as a camera 42 in a detector station 30, may be configured to track the person prior to the person entering the POS lane 2 to obtain a set of data, where the processor 202 may determine a confidence level of a shrink event based at least in part on the set of data.

In some embodiments, the processor 202 may generate an alert upon an RFID reader reading an RFID tag and the confidence level exceeding a threshold level. The processor may generate an alert upon the first RFID reader reading an RFID tag, where the alert includes an indication of the confidence level. For example, a confidence level above a threshold level of 90% of the occurrence of shrink event may cause the alert to be sent to store personnel 24. The confidence level may be determined based on a number of factors, e.g., the direction of the person (e.g., is the person heading toward an exit) which can be determined on two readings from two detectors to determine a position at a first time and a next position at a second time, whether the person is carrying a product, which can be determined based on an RFID tag associated with a product (e.g., 104 or 106) that a person is carrying, etc.

In various embodiments, a second RFID reader may be configured to detect at least one incoming RFID tag, where the incoming RFID tag is a tag that is brought into the venue from outside of the venue. In such embodiments, the processor (e.g., processor 202) may generate an alert upon the second RFID reader reading the incoming RFID tag. In an alternative embodiment, the processor (e.g., processor 202) may generate an alert upon the first RFID reader reading an RFID tag in the POS lane and determining that the RFID tag in the POS lane is different from the at least one incoming RFID tag. In some embodiments, the second RFID reader may be positioned by a points of ingress or egress (e.g., entrances or exits) of venue 100 typically used by customers or other individuals. In such embodiments, RFID tags brought into the venue 100 by customers or other individuals may be detected and tracked regardless of whether the customers or individuals pass through a POS lane or not.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for selectively activating a first radio frequency (RF) identification (RFID) reader within a venue having a point of sale (POS) lane, the system comprising:
   a first detector configured to detect a POS lane activity state of the POS lane, the POS lane activity state being one of active and inactive;
   a second detector configured to detect a presence of a person in the POS lane, the second detector includes a video camera, the video camera being configured to track the person in the POS lane and obtain positional data associated with the person; and
   at least one processor operatively connected to the first detector, the second detector, and the first RFID reader, the at least one processor configured to activate the first RFID reader upon the first detector indicating the POS lane activity state being inactive and the second detector indicating the presence of the person in the POS lane, the at least one processor being further configured to cause the first RFID reader to transmit an interrogation signal at a power level, the power level being based at least in part on the positional data,
   wherein the first RFID reader has a reading range, the reading range extending over the POS lane.

2. The system of claim 1, wherein the at least one processor is further configured to generate an alert upon the first RFID reader reading an RFID tag.

3. The system of claim 2, further comprising a security module, wherein the alert is transmitted to the security module.

4. The system of claim 1, wherein the at least one processor is further configured to adjust the power level in response to a change in the positional data.

5. The system of claim 1, wherein the at least one processor is further configured to adjust the power level in response to the positional data being static.

6. The system of claim 1, wherein the at least one processor is further configured to adjust the power level in response to an RF noise level associated with the positional data.

7. The system of claim 1, wherein the at least one processor is further configured to cause the first RFID reader to transmit the interrogation signal in a direction, the direction being based at least in part on the positional data.

8. The system of claim 7, wherein the at least one processor is further configured to adjust the direction in response to a change in the positional data.

9. The system of claim 1, wherein the video camera is further configured to track the person prior to the person entering the POS lane to obtain a set of data, and wherein the at least one processor is further configured determine a confidence level of a shrink event based at least in part on the set of data.

10. The system of claim 9, wherein the processor is further configured to generate an alert upon the first RFID reader reading an RFID tag and the confidence level exceeding a threshold level.

11. The system of claim 9, wherein the processor is further configured to generate an alert upon the first RFID reader reading an RFID tag, the alert including an indication of the confidence level.

12. The system of claim 1, further comprising a second RFID reader configured to detect at least one incoming RFID tag, the at least one incoming RFID tag being brought into the venue from outside of the venue.

13. The system of claim 12, wherein the at least one processor is further configured to generate an alert upon the first RFID reader reading an RFID tag in the POS lane and determining that the RFID tag in the POS lane is different from the at least one incoming RFID tag.

14. The system of claim 12, wherein the at least one processor is further configured to generate an alert upon the second RFID reader reading the at least one incoming RFID tag.

15. The system of claim 1, wherein the first RFID reader is positioned between the POS lane and another POS lane.

16. A method for selectively activating a first radio frequency (RF) identification (RFID) reader within a venue having a point of sale (POS) lane, the method comprising:
    detecting, via a first detector, a POS lane activity state of the POS lane, the POS lane activity state being one of active and inactive;
    detecting, via a second detector, a presence of a person in the POS lane; and
    activating, via at least one processor, the first RFID reader upon the first detector indicating the POS lane activity state being inactive and the second detector indicating the presence of the person in the POS lane,
    wherein the first RFID reader includes a reading range, the reading range extending over the POS lane, and wherein the at least one processor is operatively connected to the first detector, the second detector, and the first RFID reader,
    wherein the second detector includes a video camera,
    wherein the video camera is configured to track the person in the POS lane and obtain positional data associated with the person, and
    wherein the at least one processor is further configured to cause the first RFID reader to transmit an interrogation signal at a power level, the power level being based at least in part on the positional data.

17. The method of claim 16, wherein the at least one processor is further configured to generate an alert upon the first RFID reader reading an RFID tag.

18. The method of claim 17, wherein the alert is transmitted to a security module.

19. The method of claim 16, wherein the at least one processor is further configured to adjust the power level in response to a change in the positional data.

20. The method of claim 16, wherein the at least one processor is further configured to adjust the power level in response to the positional data being static.

21. The method of claim 16, wherein the at least one processor is further configured to adjust the power level in response to an RF noise level associated with the positional data.

22. The method of claim 16, wherein the at least one processor is further configured to cause the first RFID reader to transmit the interrogation signal in a direction, the direction being based at least in part on the positional data.

23. The method of claim 22, wherein the at least one processor is further configured to adjust the direction in response to a change in the positional data.

24. The method of claim 16, wherein the video camera is further configured to track the person prior to the person entering the POS lane to obtain a set of data, and wherein the at least one processor is further configured determine a confidence level of a shrink event based at least in part on the set of data.

25. The method of claim 24, wherein the processor is further configured to generate an alert upon the first RFID reader reading an RFID tag and the confidence level exceeding a threshold level.

26. The method of claim 24, wherein the processor is further configured to generate an alert upon the first RFID reader reading an RFID tag, the alert including an indication of the confidence level.

27. The method of claim 16, further comprising a second RFID reader configured to detect at least one incoming RFID tag, the at least one incoming RFID tag being brought into the venue from outside of the venue.

28. The method of claim 27, wherein the at least one processor is further configured to generate an alert upon the first RFID reader reading an RFID tag in the POS lane and determining that the RFID tag in the POS lane is different from the at least one incoming RFID tag.

29. The method of claim 27, wherein the at least one processor is further configured to generate an alert upon the second RFID reader reading the at least one incoming RFID tag.

30. The method of claim 16, wherein the first RFID reader is positioned between the POS lane and another POS lane.

31. A system for selectively activating a first radio frequency (RF) identification (RFID) reader within a venue having a point of sale (POS) lane, the system comprising:
    a first detector configured to detect a POS lane activity state of the POS lane, the POS lane activity state being one of active and inactive;
    a second detector configured to detect a presence of a person in the POS lane, the second detector includes a video camera, the video camera being configured to track the person in the POS lane and obtain positional data associated with the person; and
    at least one processor operatively connected to the first detector, the second detector, and the first RFID reader, the at least one processor configured to activate the first RFID reader upon the first detector indicating the POS lane activity state being inactive and the second detector indicating the presence of the person in the POS lane, the at least one processor being further configured to cause the first RFID reader to transmit an interrogation signal in a direction, the direction being based at least in part on the positional data, wherein the first RFID reader has a reading range, the reading range extending over the POS lane.

* * * * *